United States Patent [19]
Williams

[11] Patent Number: 5,548,888
[45] Date of Patent: Aug. 27, 1996

[54] METHOD OF SECURING A QUICK-INSTALL SEAT SWITCH

[75] Inventor: Thomas D. Williams, Hudson, Ohio

[73] Assignee: Delta Systems, Inc., Streetsboro, Ohio

[21] Appl. No.: 390,082

[22] Filed: Feb. 17, 1995

Related U.S. Application Data

[62] Division of Ser. No. 97,518, Jul. 27, 1993, Pat. No. 5,424,502.

[51] Int. Cl.⁶ .................................................. H01H 11/00
[52] U.S. Cl. .................................................. 29/622
[58] Field of Search ............................ 29/622; 200/85 A

[56] References Cited

U.S. PATENT DOCUMENTS 3,829,803  8/1974  Maeda .
3,969,875  7/1976  Nofel .
4,795,865  1/1989  Howard .
4,839,478  6/1989  Howard .
5,124,512  6/1992  Huettner et al. .
5,190,019  3/1993  Harvey .

*Primary Examiner*—P. W. Echols
*Attorney, Agent, or Firm*—Watts, Hoffman, Fisher & Heinke

[57] ABSTRACT

A safety switch assembly for deactivating a motor vehicle if a user is not positioned on a vehicle seat. The assembly includes a base for mounting a switch, a cover that moves in response to the presence of a vehicle operator on the seat, and an actuator that moves with the cover to open and close switch contacts inside a switch housing. The base is constructed to pass through a cutout in a vehicle seat pan and includes extensions that also pass through the cutout. The projections are inhibited from movement back through the cutout after the base is rotated from an orientation that allows the projections to be inserted through the cutout to an orientation in which the projections overlie the seat pan.

5 Claims, 5 Drawing Sheets

METHOD OF SECURING A QUICK-INSTALL SEAT SWITCH

This is a division of application Ser. No. 08/097,518, file Jul. 27, 1993 now U.S. Pat. No. 5,424,502.

FIELD OF THE INVENTION

The present invention concerns a seat switch for use on a riding utility. vehicle and more particularly for a seat switch for use with lawn and garden tractors having a blade or power take off connections.

BACKGROUND ART

It is common in the prior art to equip a lawn or garden tractor with a seat switch that allows the operator's presence on the seat to be monitored. If the lawn or garden tractor is running and the operator steps off the tractor, there is a danger that the operator will be seriously injured by the blade or the power take off of the tractor. To reduce the hazard of such serious accidents electrical circuits are used to disable the engine if the tractor's blade and/or power take off is engaged and the operator steps (or falls) from the tractor seat. One example of such a circuit is found in prior art U.S. Pat. No. 5,190,019 to Harvey which issued on Mar. 2, 1993.

The '019 Harvey patent discloses a seat switch that in combination with other switches forms a circuit that can disable a magneto energized spark plug on a lawn or garden tractor. The seat switch of the Harvey patent is of a design that is closed when the operator is seated on the seat and opens in the event the operator leaves the seat. As noted in the Harvey patent; the circuit does not necessarily deactivate the engine but does so if a dangerous situation is sensed. The disclosure of the Harvey patent is incorporated herein by reference.

Normally open switches suitable for use in the circuit disclosed in the Harvey '019 patent are known in the prior art. U.S. Pat. No. 4,839,478 to Howard discloses a push button switch having a push in plunger that actuates the switch. For a normally open switch, actuation of the plunger causes the switch contacts within a switch housing to be bridged by a conductive spring that is biased against inner, opposed surfaces of the switch contacts. The disclosure of the '478 patent to Howard is incorporated herein by reference.

U.S. Pat. No. 4,795,865 to Howard which issued on Jan. 3, 1989 discloses a safety switch mounting assembly for positioning a switch on a seat pan. The assembly includes a base for mounting the assembly, a cover that moves in response to the presence of a vehicle operator on the seat and an actuator that moves with the cover to open and close switch contacts inside an actuator housing. The contacts of the switch can be normally open or normally closed. The disclosure of the '865 patent to Howard is incorporated herein by reference. The seat switch base shown in the '865 patent to Howard includes two holes that extend through the base and allow the base to be mounted to the seat pan.

U.S. Pat. No. 5,124,512 to Huettner et al discloses a seat assembly for a utility vehicle. The seat base assembly includes a base portion, a seat cushion and a switching device for switching on and off an electrical circuit.

U.S. Pat. No. 3,829,803 to Maeda discloses a detecting device that includes a pressure receiving member and a magnetically actuated switch coupled to a bracket that supports the pressure receiving member. The device is mounted on a seat spring of a vehicle seat. The so called pressure receiving member is coupled to a bracket that engages a vehicle seat spring. The engagement between the bracket and the pressure receiving member is via a bayonet coupling .

DISCLOSURE OF THE INVENTION

The present invention concerns a switch assembly for use in mounting a switch to a vehicle seat, typically for a vehicle such as a riding lawn mower, garden tractor or the like. The invention includes structure that engages a seat pan having a cutout configured to accommodate a base that supports an operator-actuated switch. The cutout is preferably generally circular with radial extending notches that extend through the seat pan. The switch apparatus includes a switch base having a wall with an outer perimeter dimensioned to allow the base to be pushed through the seat pan cutout from beneath the seat.

A number of seat pan engaging members extend radially from the wall of the base. They are of a size and are spaced around the periphery of the base to allow the pan engaging members to be inserted through the notches in the seat pan, pushed through the cutout, and rotated to secure the base to the seat pan. The base is coupled to the seat pan with a seat switch already mounted to the base. An actuator extends away from a switch housing and rises above the seat pan in a space between the seat pan and a seat cushion that closes and opens the switch as the operator gets on and off the vehicle.

A preferred use for the seat switch is to de-activate the vehicle engine. A seat cushion carried by the seat is spaced above the actuator when the vehicle seat is unoccupied. When an operator sits on the seat, the cushion is deformed, bringing a bottom surface of the cushion into contact with the switch actuator to close normally open contacts within the seat switch.

Use of the disclosed apparatus facilitates mounting of the seat switch and requires no special connectors or installation tools. The seat pan is manufactured with an appropriately configured cutout and the seat switch elements mounted to the seat pan by a simple insertion and rotation of the switch assembly. In the event the seat switch must be replaced, it can be removed from the seat without moving the seat cushion.

A simple and easy-to-install seat switch assembly is one object of the present invention. This and other objects, advantages and features of the invention will become better understood from a detailed description of a preferred embodiment of the invention which is described in conjunction with the accompanying drawings.

BEST MODE FOR PRACTICING THE INVENTION

Figure 1:
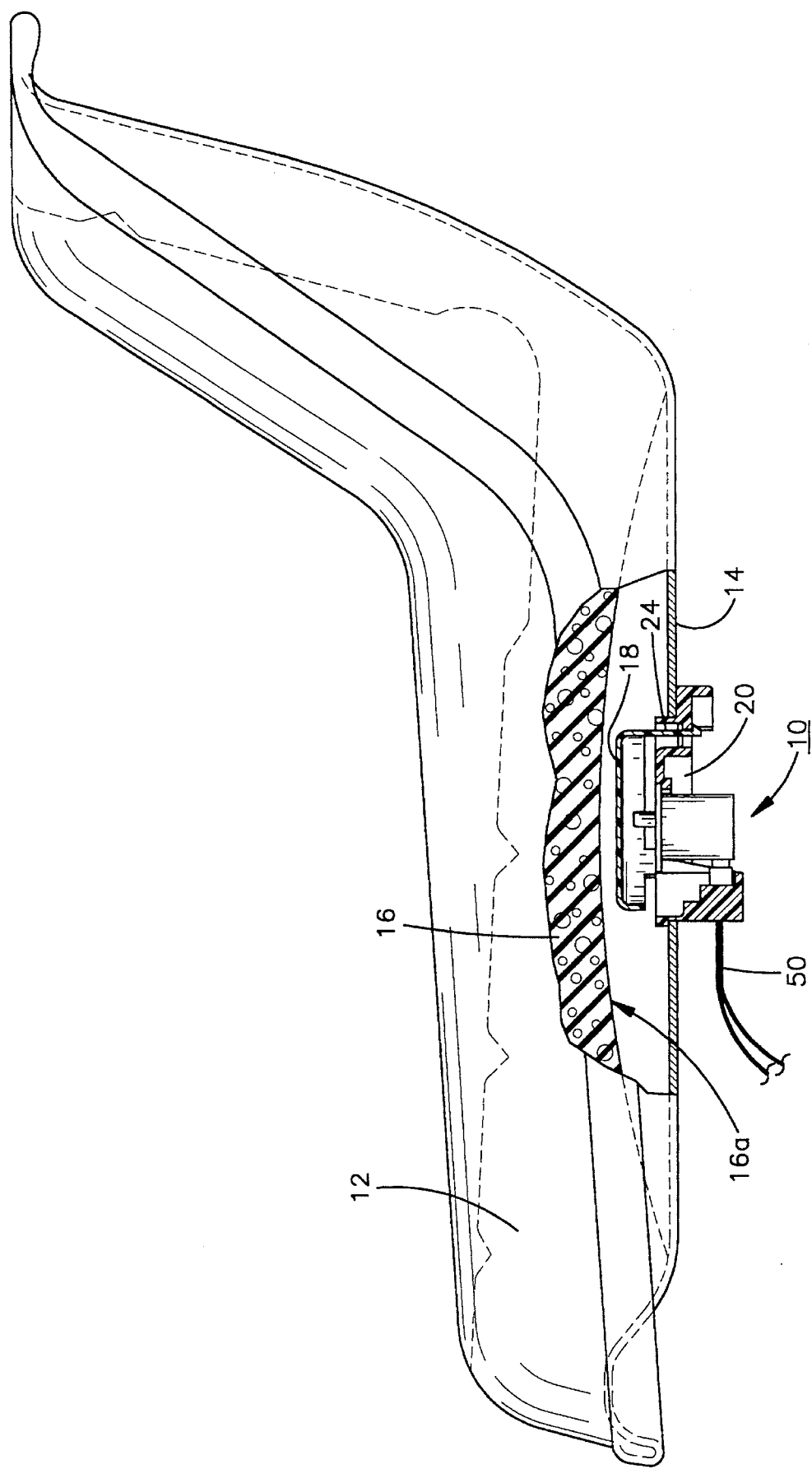
FIG. 1 is a partially sectioned side view of a vehicle seat including a switch assembly constructed in accordance with the invention.

Turning now to the drawings, FIG. 1 illustrates a switch assembly 10 mounted to a seat 12 such as a riding lawn mower seat or garden tractor. The seat 12 shown in FIG. 1 is constructed of a seat pan 14 of metal or rigid plastic covered with a pliable cushion 16. The switch assembly 10 has a movable switch cover 18 that moves to close a switch contact in the ignition circuit of the vehicle when the seat cushion 16 is distorted by the weight of an operator.

The switch assembly 10 is connected to the seat pan 14 by a switch assembly base 20. The switch cover 18 is connected to the base 20 and extends above an upper surface of the seat pan 14. When the seat is unoccupied, the cushion 16 defines a generally concave lower surface 16a spaced from the cover 18.

Figure 5:
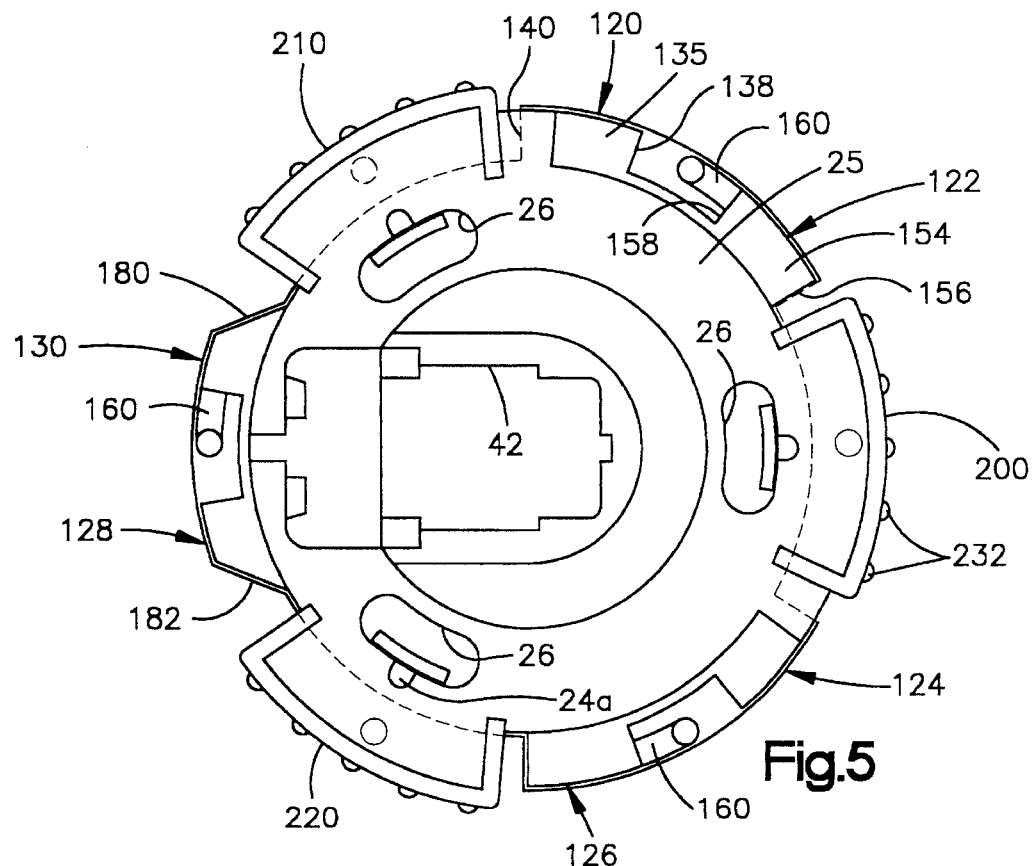
FIGS. 5 and 6 are plan views as seen from beneath the seat pan showing insertion of the switch assembly into a seat pan cutout and subsequent rotation of the switch assembly to secure the switch assembly to the seat pan.

Integral with the cover 18 are three equally spaced flexible and resilient legs 24 that connect the cover 18 to the base 20. Note, only two of the legs 24 are visible in the perspective view of FIG. 2. The three legs 24 have flanged ends 24a that fit through three equally spaced openings 26 (FIG. 5) that extend through the base 20 to a bottom surface 21. The legs 24 are flexed inward as the flanged ends 24a are pushed through the openings 26. In an unstressed or unflexed position, the legs are generally perpendicular to a cover surface 18a. After the legs 24 are flexed inward and pushed into the openings 26, they are released and return to their original shape. An outwardly facing portion of the flanged ends 24a overlaps a bottom surface 21 of the base 20 to retain the cover and limit its movement away from the base.

With the cover 18 mounted to the base 20, a downward facing lip or edge 28 of the cover 18 is positioned above a circular recess 30 between inner and outer walls 31, 32 in the base 20. As a vehicle operator sits on the cushion 16, the cushion contacts the cover 18 and moves it toward the base 20 so that the lip or edge 28 fits within the circular recess 30.

The wall 31 defines the outer extent of a central hub portion 40 that defines an opening 42 in the base. A switch 43 fits within the opening 42 and includes a switch housing 44 supported by the base hub portion 40. The switch housing 44 forms an enclosure containing a switching mechanism. A housing cover 45 is attached to the housing 44 by heat sealing or welding. The housing 44 encloses a compressed spring that biases an actuator 46 through an opening in the cover 45. When a vehicle operator is seated on the seat 12, the weight of the operator deforms the cushion 16 causing the cushion to push the cover 18 downward and force the switch actuator 46 to move.

One wall 44a of the actuator housing 44 has openings to accommodate two metallic switch contacts 47 oriented parallel to each other that extend outside the housing 44. Connectors 48 are slid onto the contacts 47 and electrically couple the switch 43 to a circuit by means of conductors 50.

The switch cover 45 overlaps the housing 44 to define a lip 52 that extends around the cover and is disrupted by two notches 54, 55. the notches 54, 55 are positioned to orient the switch with respect to the inner hub portion 40 to fit into the notches. The lip 52 rests against a narrow slot 62 that extends around the opening 42 in the hub and supports the switch as it is welded to the base 20. The base also includes a guide 70 having openings 72, 74 into which the switch contacts 47 extend. Additional details concerning the switch mechanism supported within the housing 44 are disclosed in the '865 patent to Howard.

Figure 2:
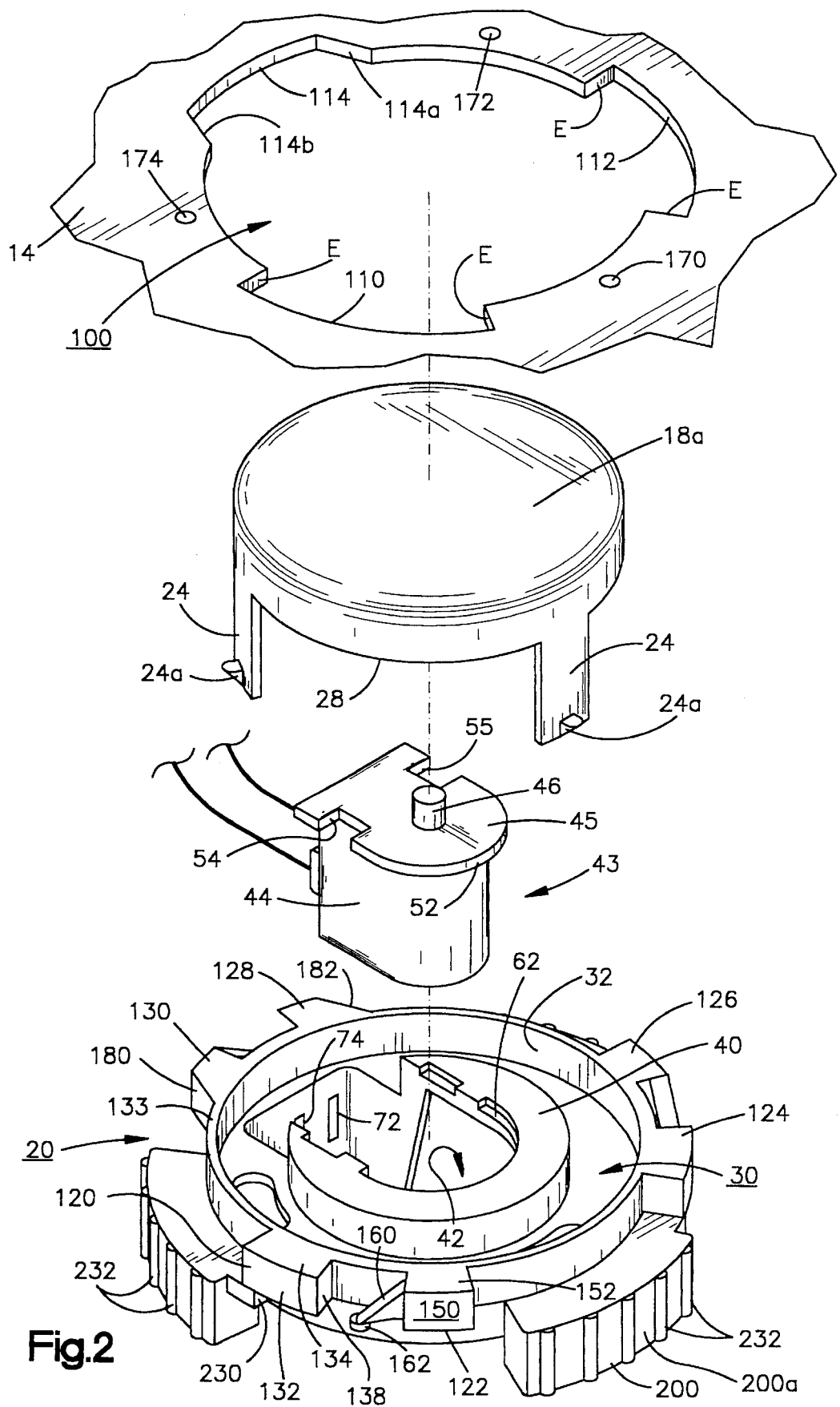
FIG. 2 is an exploded perspective view of the switch assembly showing the manner in which the assembly is inserted through a cutout in a seat pan.
Figure 3:
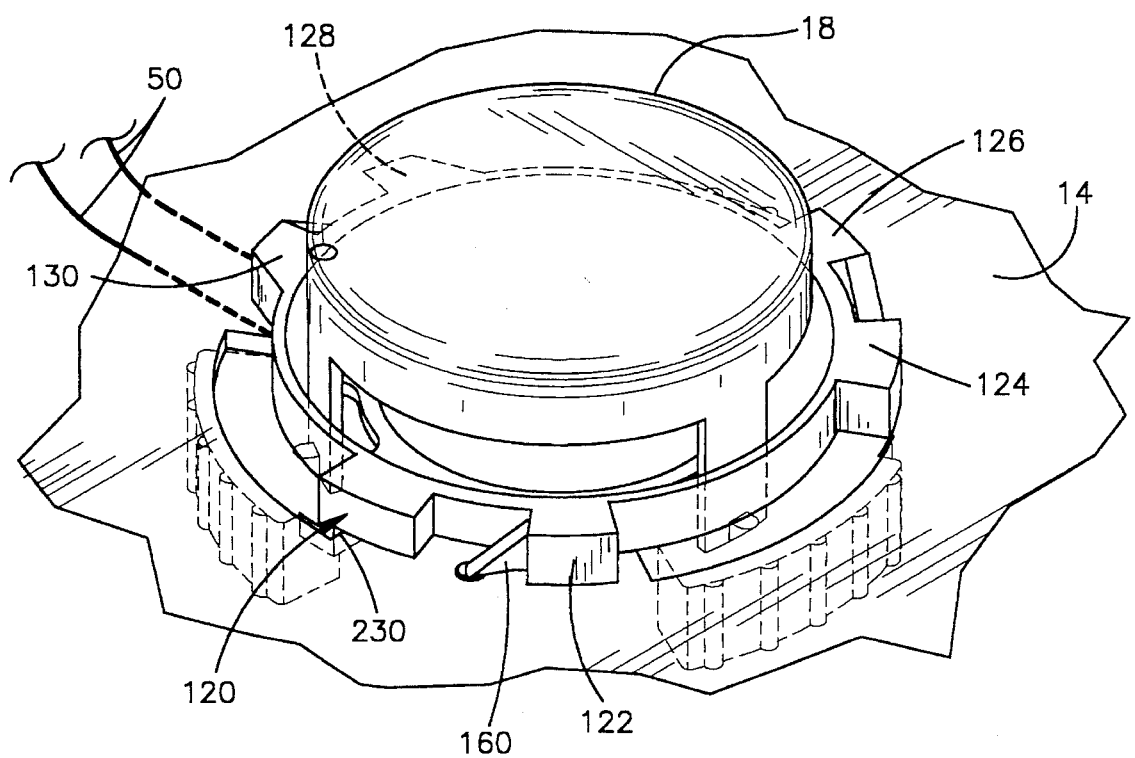
FIG. 3 is a perspective view showing the switch assembly mounted to a seat pan.

Turning now to FIG. 2, the seat pan 14 defines a cutout 100 to allow the switch assembly 10 to be pushed up through the pan 14 and secured to the seat pan by rotation of the switch assembly 10. The preferred cutout 100 includes three radially extending notches 110, 112, 114 that allow seat pan-engaging portions of the base 20 to be pushed through the notches.

In the preferred design, there are a total of six seat-engaging portions 120, 122, 124, 126, 128, 130 integral with the base 20. A first seat pan-engaging portion 120 is a generally oblong shaped land having a curved radially outer facing surface 132, a top surface 134 co-extensive with an upper edge. 133 of the cylindrical wall 32, a bottom surface 135 which engages the seat pan 14 after the assembly 10 is pushed through the seat pan cutout 100, and first and second side surfaces 138, 140 which extend radially away from the wall surface 32.

A second pan-engaging portion 122 includes an oblong land having a curved outer surface 150, top and bottom surfaces 152, 154, and first and second side surfaces 156, 158. Extending away from the side surface 158 is an arm 160 having a circular prong 162 which extends below the bottom surface 154. As seen in FIG. 2, the seat pan 14 includes three holes 170, 172, 174 spaced around the outside edge of the cutout 100 that extend through the seat pan. The prong 162 at the end of the arm 160 fits within the hole 170 of the seat pan 14 as the switch assembly 10 is mounted to the seat pan.

By referring to FIG. 2, it is seen that the radially extending slots in the seat pan are not identical. The slots 110, 112 are generally the same shape, having edges E that extend radially outward from a centerline of the seat pan cutout. The third slot 114, however, has edges 114a, 114b that are not radial, but instead slant at an acute angle with respect to a radial line passing through vertices between an outer edge of the cutout 100 and an edge of the cutout.

The difference in shape of the notches assures that the switch assembly 10 is inserted through the cutout 100 in only one orientation. As seen in FIG. 2, only the seat pan-engaging portions 128, 130 will fit through the notch 114 since sides 180, 182 of the two portions 128, 130 slant at acute angles with respect to the radial direction. Trying to push the two portions 120, 122 through the notch 110 will cause the seat pan-engaging portions to abut the seat pan and prevent insertion of the switch assembly 10.

The exploded view shown in FIG. 2 shows the base 20 of the switch assembly 10 oriented for insertion through the cutout 100. Prior to mounting, the cover 18 and switch housing 44 have been mounted to the base 20. The cover 18 is also attached by flexure and insertion of the legs 24 into the openings in the base. When so oriented, the assembly 10 is installed by pushing the base through the cutout 100 until three equally spaced gripping members 200, 210, 220 abut the bottom surface of the seat pan. The base 20 is then manually rotated in a clockwise direction (as seen from beneath the seat pan) until two stops 230 engage sides of the cutouts 112, 114. As the base 20 is rotated, the arms 160 flex away from the position shown in FIG. 2 and the prongs 162 ride over the surface of the seat pan as the base 20 is rotated.

When the stops 230 are reached, the prongs are positioned over the holes 170, 172, 174 extending through the seat pan so that the prongs fit into these holes. This prevents the assembly 10 from rotating back to the insertion position where the assembly 10 could be pushed back through the pan cutout.

Figure 7:
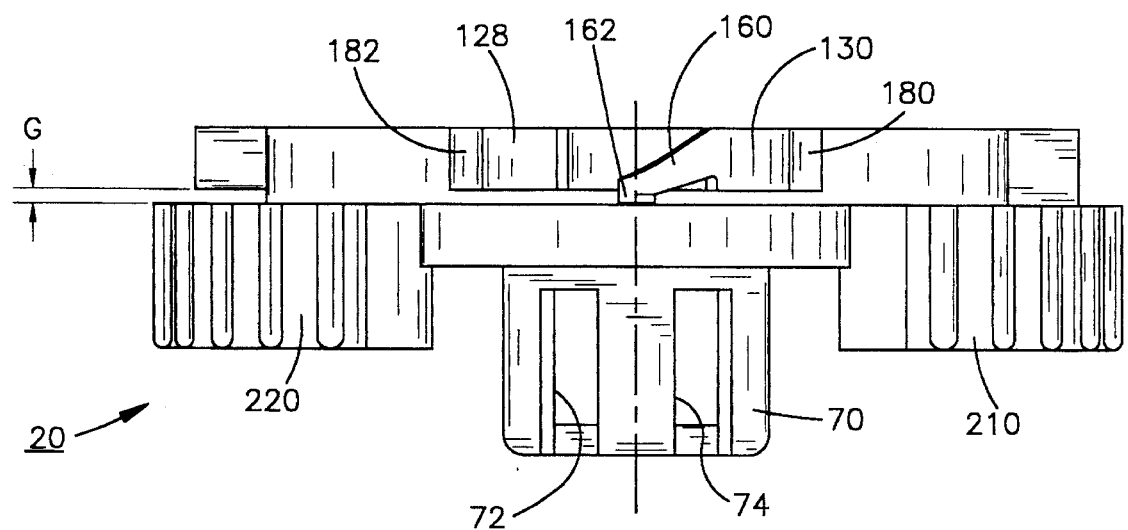
FIG. 7 is an elevation view of the switch assembly.
Figure 4:
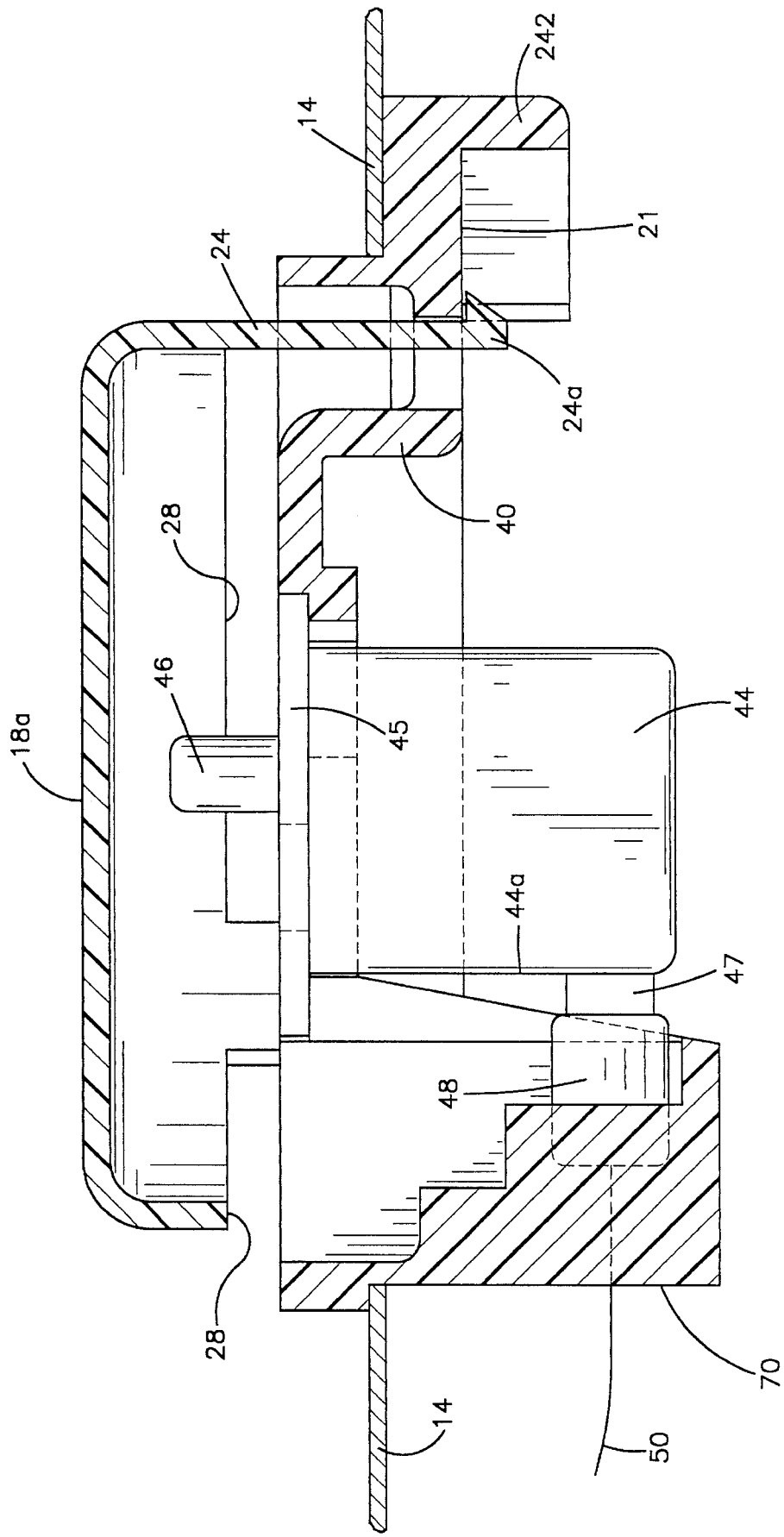
FIG. 4 is a partially sectioned side view on an enlarged scale showing the preferred construction of the seat switch assembly.
Figure 6:
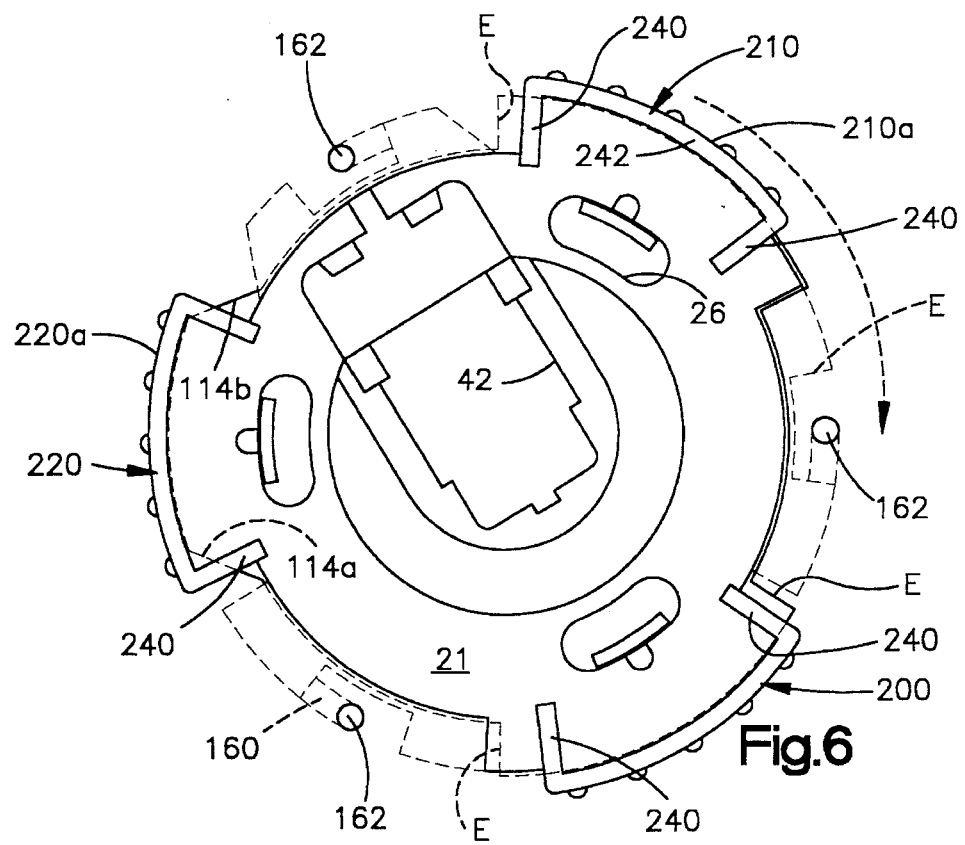

Each of the gripping member 200, 210, 220 extends radially outward farther than the members 120, 122, 124, 126, 128, 130. An outer surface 200a of the member 200 is seen in FIG. 2 to be disrupted at regular intervals by elongated ribs 232 which make the member 200 easier to grasp Similarly, the member 210, 220 have ribs 232 extending away from their outer surfaces 210a, 220a. As seen in FIG. 6, the gripping members 200, 210, 220 have, radial and circumferential walls 240, 242 so that the bottom surface 21 of the base 20 extends to the outer wall 242. As seen most clearly in FIG. 7, there is a gap G between the gripping members 200, 210, 220 and the members 120–130. This gap G is slightly greater than the thickness of the seat pan.

Once the switch assembly has been mounted to the seat pan, connection of the switch to external circuitry for de-activating the vehicle engine is accomplished by making electrical connection between the conductors 50 and the switch contacts 47.

Removal of the switch assembly 10 is accomplished by pressing inward on the three prongs 162 from beneath the seat pan to flex the arms 160 inward while simultaneously grasping the members 200, 210, 220 and rotating the base 20 counterclockwise (as seen from below). This causes the prongs to become misaligned with the holes passing through the pan cutout. Once the prongs 162 are rotated away from the holes, continued rotation of the base is accomplished by sliding the prongs over the upper surface of the seat pan until the pan-engaging members are again aligned with their appropriate notches. The seat switch assembly then can be pulled back out of the cutout for repair or replacement of the switch assembly 10.

The present invention has been described with a degree of particularity, but it is the intent that the invention include all modifications from the disclosed preferred design falling within the spirit or scope of the appended claims.

I claim:

1. A method for mounting a seat switch assembly to a vehicle seat comprising the steps of:
    a) providing a base for supporting the seat switch assembly on a seat pan, said base having a cylindrical outer surface with circumferentially spaced projections extending radially out from the cylindrical outer surfaces;
    b) mounting the seat switch assembly to the base so that a plunger extending out of a seat switch housing faces away from the seat pan in a position to be actuated when an operator sits on the vehicle seat;
    c) orienting the base in relation to a cutout provided in the seat pan having notches around the periphery of the cutout so that the projections extending from the base align with the notches in the cutout;
    d) pushing the base through the cutout in the seat pan until the projections pass through the seat pan; and
    e) rotating the base with respect to the seat pan to move the projections from an alignment position with respect to the notches in the cutout to positions overlying the seat pan.

2. A method of securing a seat switch assembly to a seat switch pan, said seat switch pan including a cutout having a central portion and a plurality of slots extending outwardly from said central portion, said seat switch assembly including a base having a switch actuator extending therefrom, said base including a first portion and second portion spaced apart from said first portion, said first portion including a plurality of outwardly extending projections sized to pass through the cutout slots when said base is in an alignment position with respect to said seat pan cutout, said second portion of said base sized to abut said seat pan when said upper portion is passed through said seat pan cutout, the steps of the method comprising:
    a) positioning the base in the alignment position;
    b) inserting the base through the seat pan cutout until the second portion of the base abuts the seat pan; and,
    c) rotating the base with respect to the seat pan to move the projections on the base away from the alignment position.

3. A method of securing a seat switch assembly to a seat switch pan as set forth in claim 2 wherein the seat pan additionally includes an aperture and said first portion of said base includes an extending prong adapted to fit into said aperture and further wherein step (c) of the method additionally includes the substep of rotating the base until said prong is positioned in said seat pan aperture thereby preventing further rotation of the base with respect to the seat pan.

4. A method for mounting a seat switch assembly to a vehicle seat pan having an irregular shaped cutout, the seat switch assembly including an upper portion having a cross sectional shape corresponding to said seat pan cutout and a lower portion spaced apart from said upper portion, said lower portion having a cross sectional shape different than said cross sectional shape of said upper portion, the steps of the method comprising:
    a) orienting the seat switch assembly such that the upper portion is aligned with the seat pan cutout for insertion through the cutout;
    b) pushing the seat switch assembly upper portion through the seat pan cutout such that the lower portion abuts the seat pan; and,
    c) rotating the seat switch assembly with respect to the seat pan such that at least a part of the seat switch upper portion overlies a portion of a first surface of the seat pan and at least a part of the seat switch lower portion overlies a portion of a second surface of the seat pan.

5. The method of mounting a seat switch assembly to a vehicle seat pan as set forth in claim 4 wherein the seat pan further includes at least one aperture and the upper portion of the seat switch assembly includes an extending prong adapted to fit into said aperture and wherein the step (c) of the method includes the substep of rotating the switch assembly until said prong is inserted into said aperture thereby preventing further rotation of the seat switch assembly.

* * * * *